(No Model.) 11 Sheets—Sheet 1.

H. D. STONE & C. THIBODEAU.
PAPER BOX MAKING MACHINE.

No. 523,155. Patented July 17, 1894.

WITNESSES—
H. A. Hall.
J. Martin Tilley

INVENTORS:
H. D. Stone,
C. Thibodeau,
by Wright, Brown & Crossley,
Attys.

(No Model.) 11 Sheets—Sheet 2.
H. D. STONE & C. THIBODEAU.
PAPER BOX MAKING MACHINE.

No. 523,155. Patented July 17, 1894.

(No Model.) 11 Sheets—Sheet 4.

H. D. STONE & C. THIBODEAU.
PAPER BOX MAKING MACHINE.

No. 523,155. Patented July 17, 1894.

WITNESSES:

INVENTORS

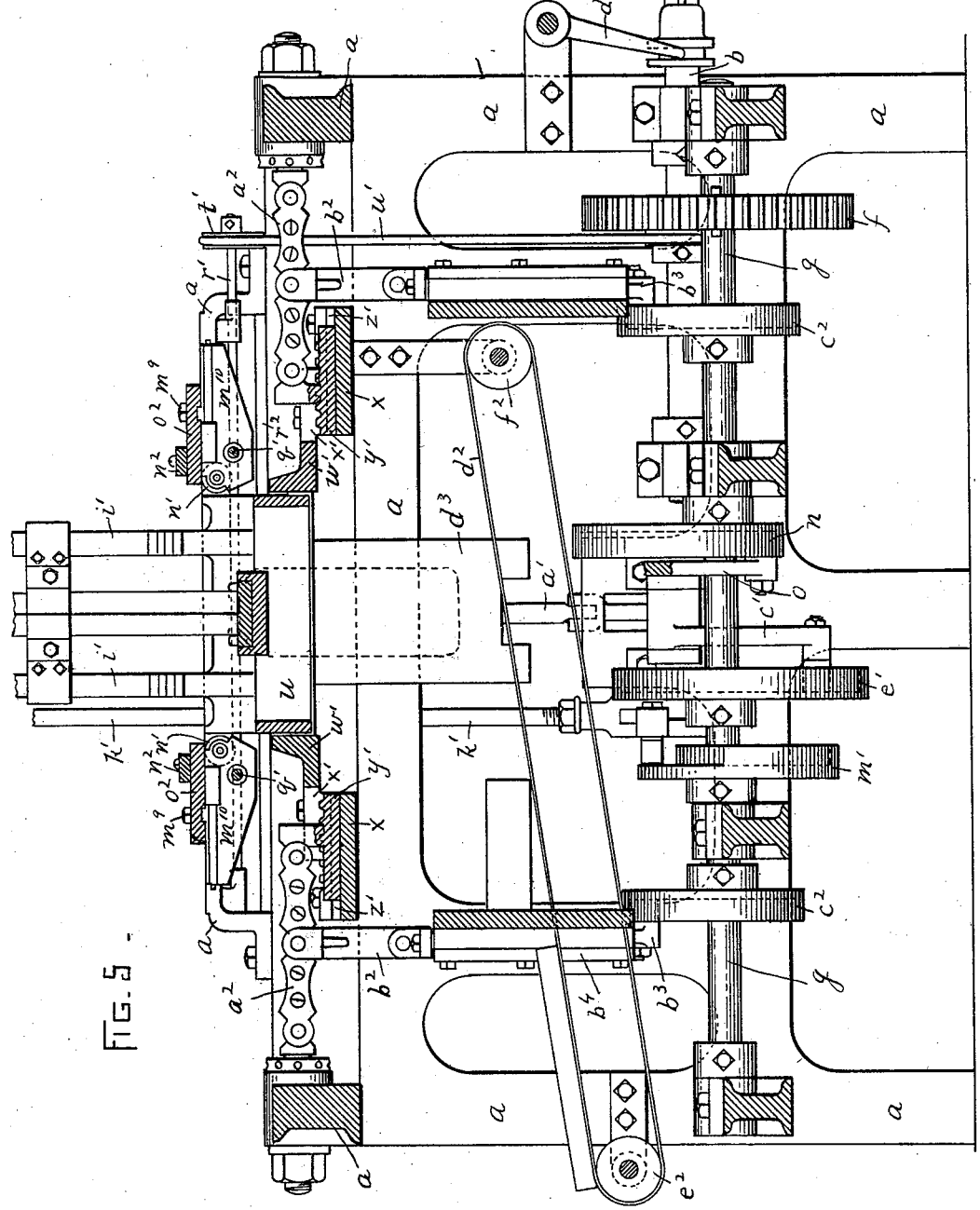

(No Model.) 11 Sheets—Sheet 6.
H. D. STONE & C. THIBODEAU.
PAPER BOX MAKING MACHINE.
No. 523,155. Patented July 17, 1894.
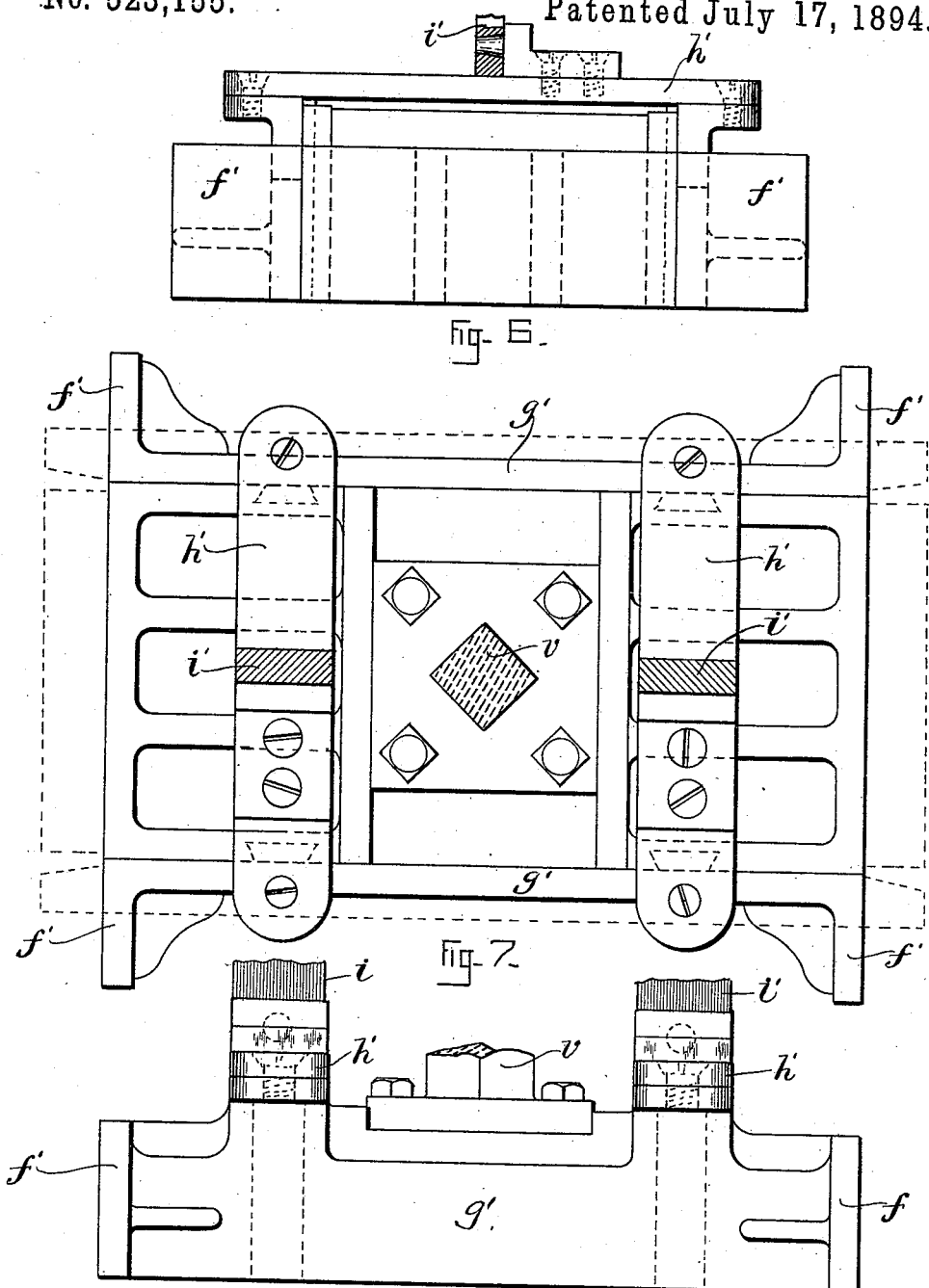
WITNESSES: INVENTORS:

(No Model.) 11 Sheets—Sheet 7.

H. D. STONE & C. THIBODEAU.
PAPER BOX MAKING MACHINE.

No. 523,155. Patented July 17, 1894.

WITNESSES: H. A. Hall.

INVENTORS: H. D. Stone, C. Thibodeau (No Model.) 11 Sheets—Sheet 8.

H. D. STONE & C. THIBODEAU.
PAPER BOX MAKING MACHINE.

No. 523,155. Patented July 17, 1894.

WITNESSES
H. A. Hall.
J. Martha Tilley

INVENTORS
H. D. Stone,
C. Thibodeau
by Wright, Brown & Crossley
Attys.

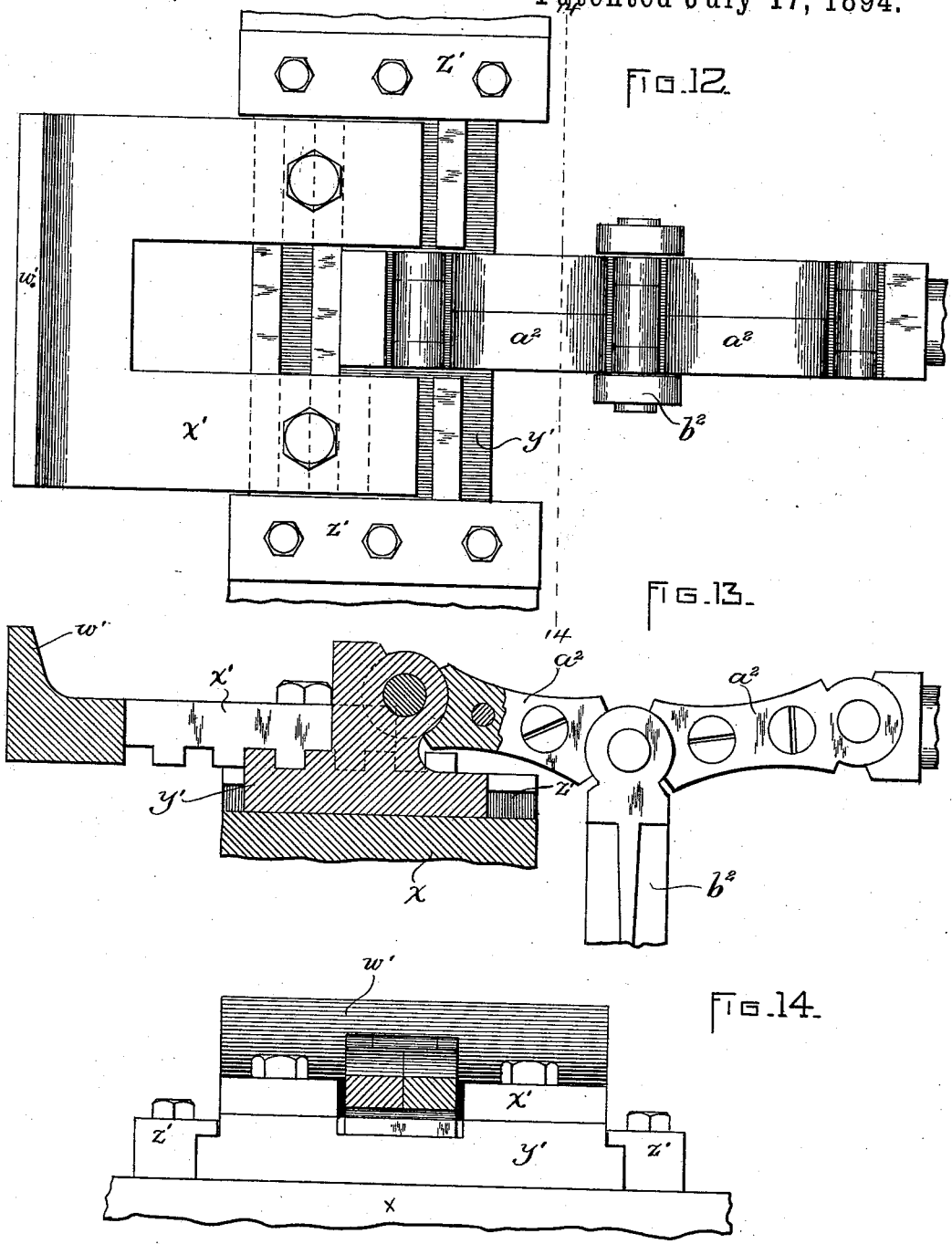

(No Model.) 11 Sheets—Sheet 10.

H. D. STONE & C. THIBODEAU.
PAPER BOX MAKING MACHINE.

No. 523,155. Patented July 17, 1894.

WITNESSES:

INVENTORS:
H. D. Stone
C. Thibodeau
by Wright, Brown & Crossley
Attorneys (No Model.) 11 Sheets—Sheet 11.

H. D. STONE & C. THIBODEAU.
PAPER BOX MAKING MACHINE.

No. 523,155. Patented July 17, 1894.

WITNESSES:
H. A. Hall.
J. Martin Ailey

INVENTORS:
H. D. Stone
C. Thibodeau
by Wright, Brown & Crossley
Attys.

THE NORRIS PETERS CO., PHOTO-LITHO., WASHINGTON, D. C.

UNITED STATES PATENT OFFICE.

HENRIE D. STONE, OF BOSTON, AND CHARLES THIBODEAU, OF SOMERVILLE, ASSIGNORS TO JAMES S. NEWELL & CO., OF BOSTON, MASSACHUSETTS.

PAPER-BOX-MAKING MACHINE.

SPECIFICATION forming part of Letters Patent No. 523,155, dated July 17, 1894.

Application filed April 2, 1892. Serial No. 427,445. (No model.)

*To all whom it may concern:*

Be it known that we, HENRIE D. STONE, of Boston, in the county of Suffolk, and CHARLES THIBODEAU, of Somerville, in the county of Middlesex, State of Massachusetts, have invented certain new and useful Improvements in Paper-Box-Making Machines, of which the following is a specification.

Our invention has relation to machines for making paper or paste-board boxes; and it is the purpose of our improvements to provide a machine which shall be simple in construction, and inexpensive of manufacture, considered with regard to the work it performs and which shall be, at the same time, certain in operation and rapid in the performance of its functions.

To these ends, our invention consists in the construction and combination of parts as hereinafter described and claimed.

Reference is to be had to the annexed drawings, and to the letters marked thereon, forming a part of this specification, the same letters designating the same parts or features, as the case may be, wherever they occur.

Figure 1:
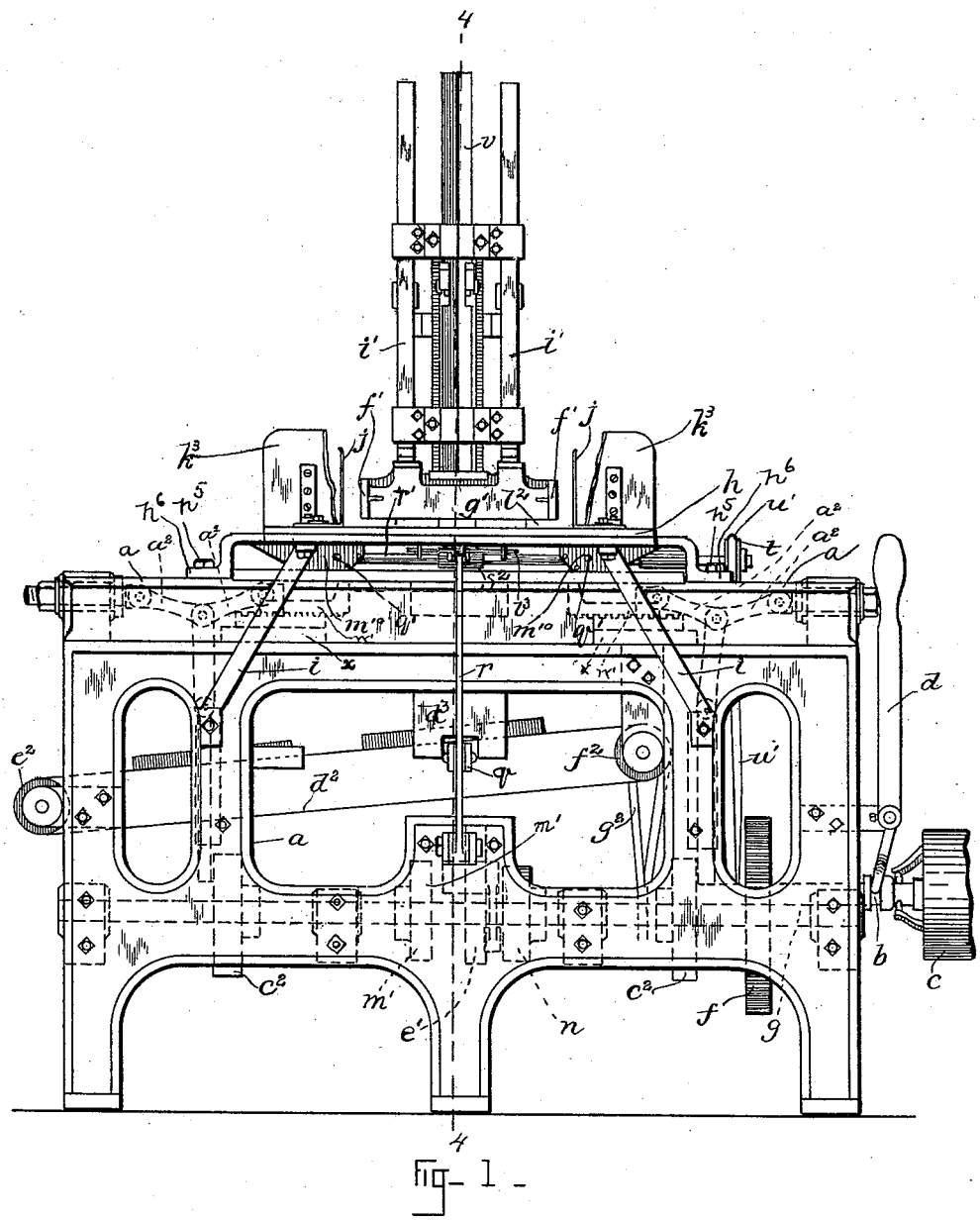
Figure 2:
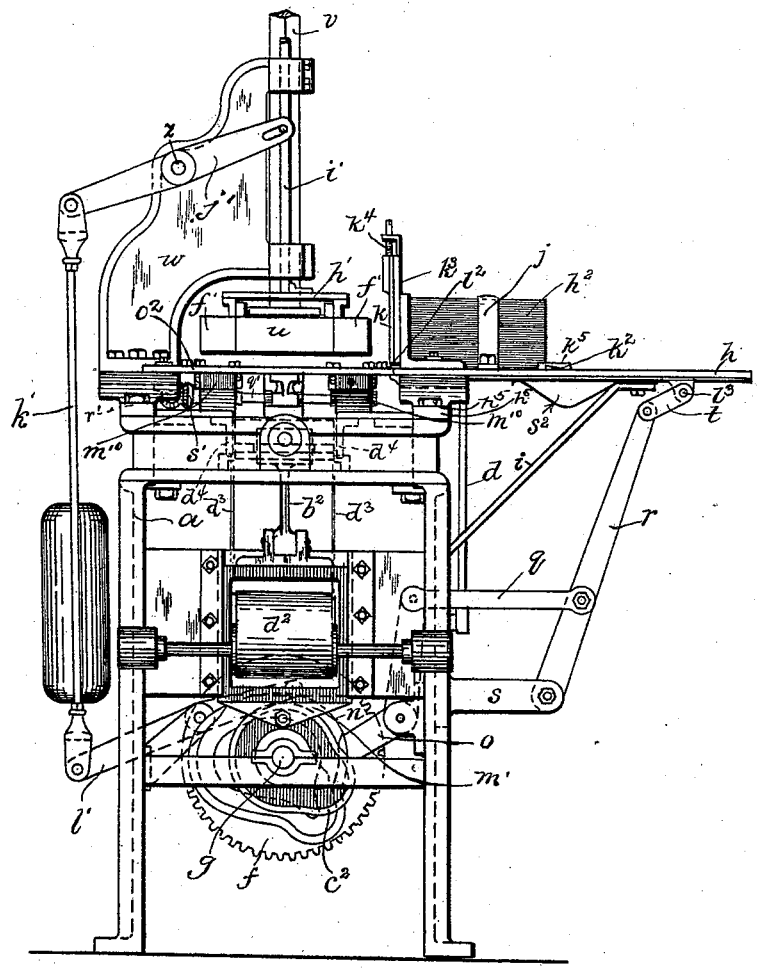
Figure 3:
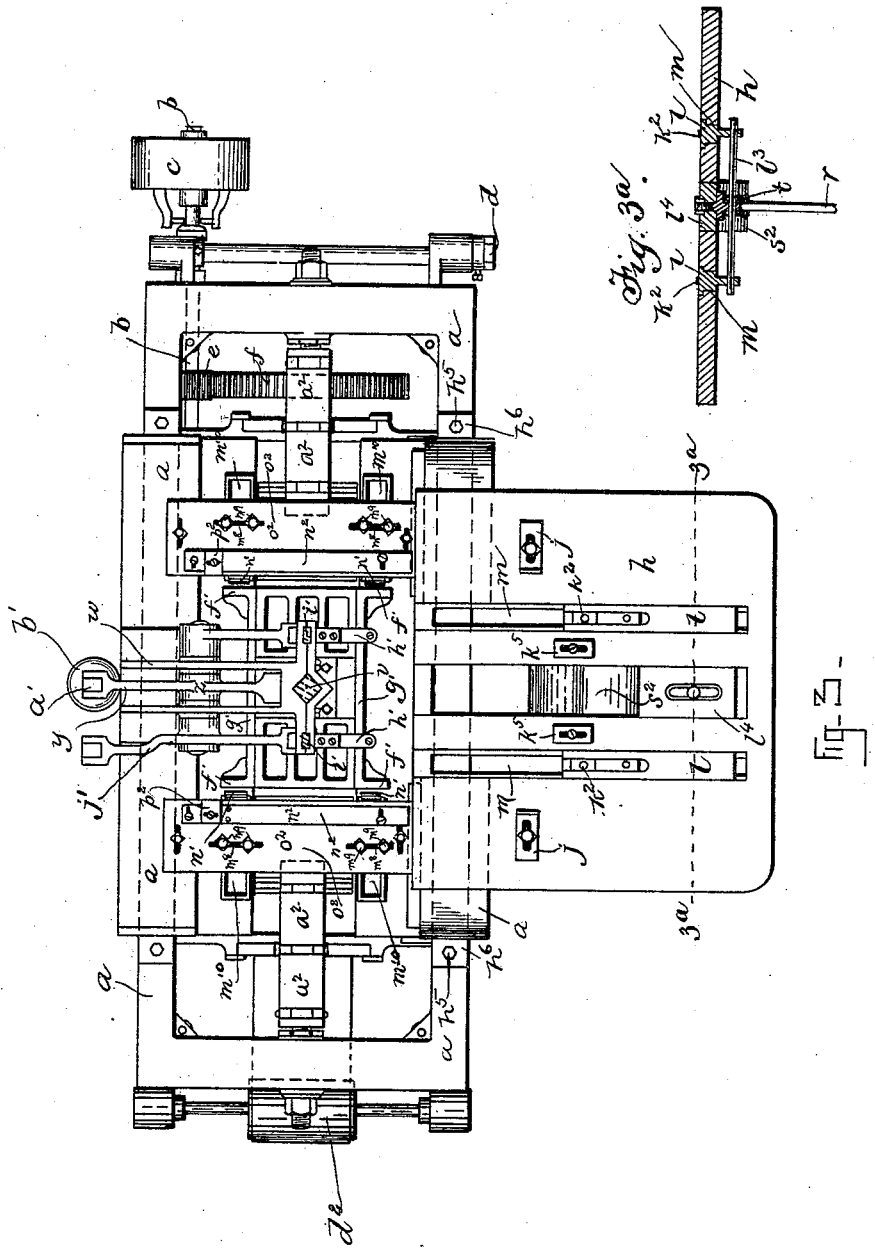
Figure 4:
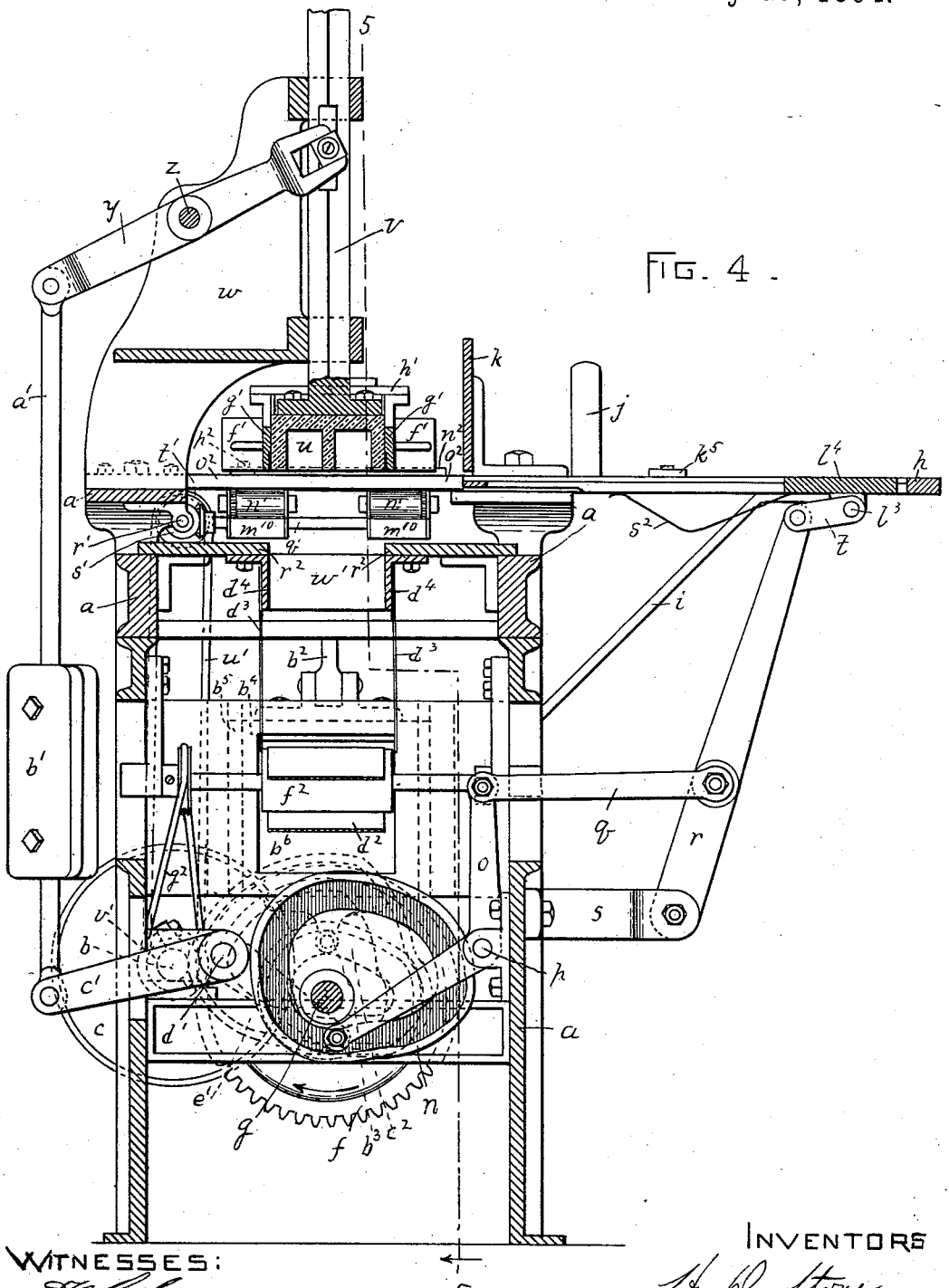
Figure 9:
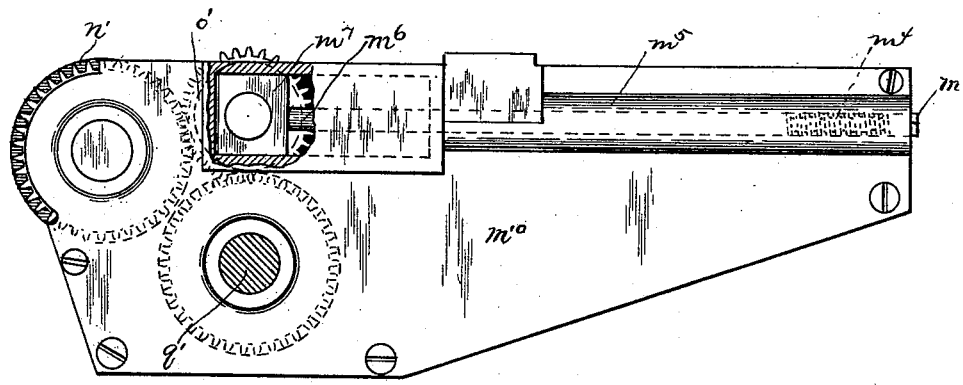
Figure 10:
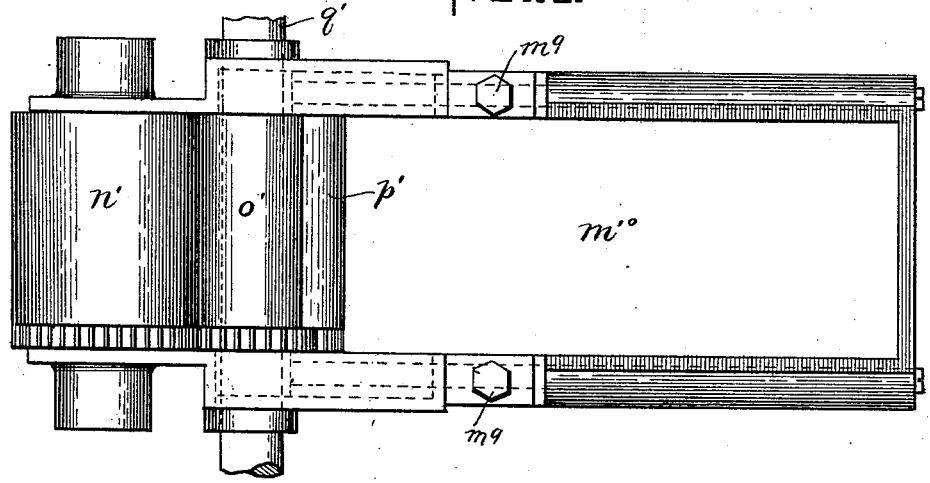
Figure 11:
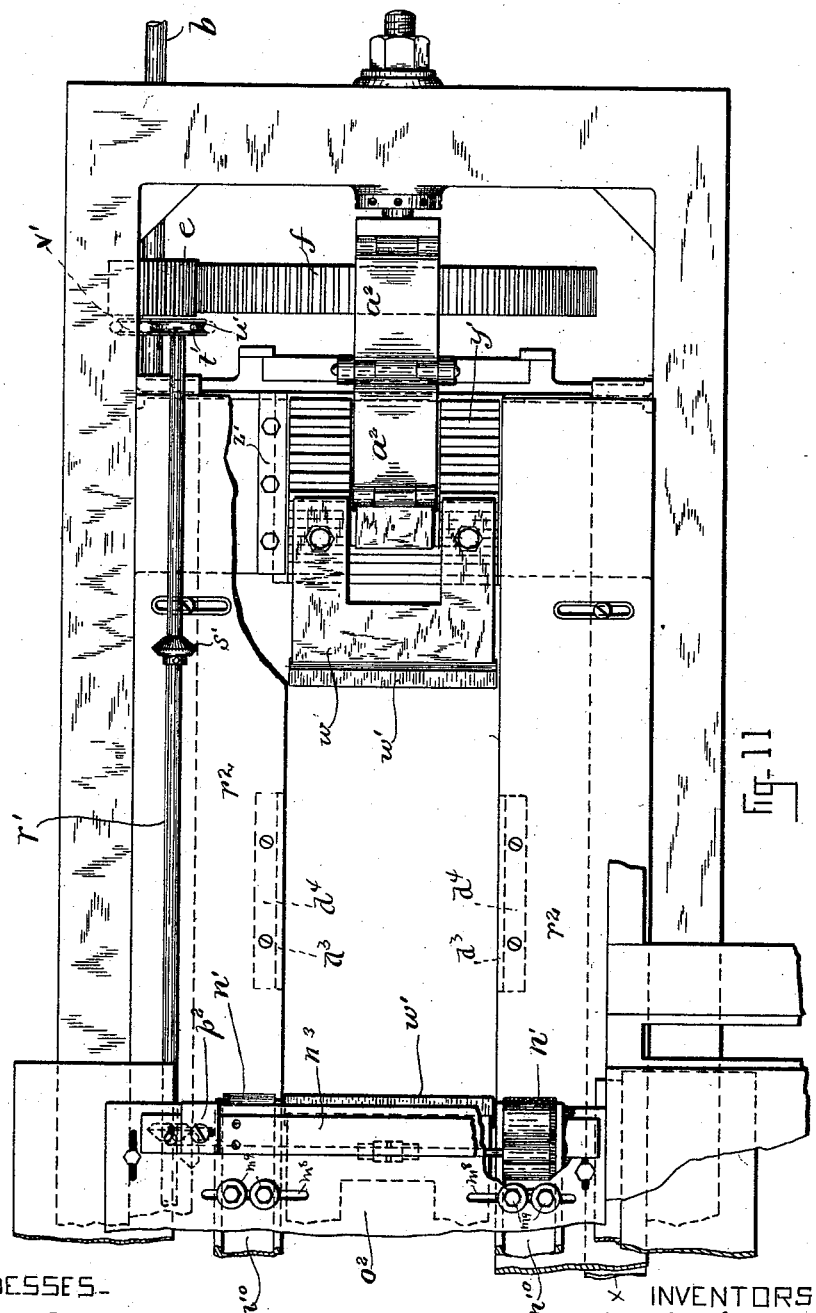
Figure 15:
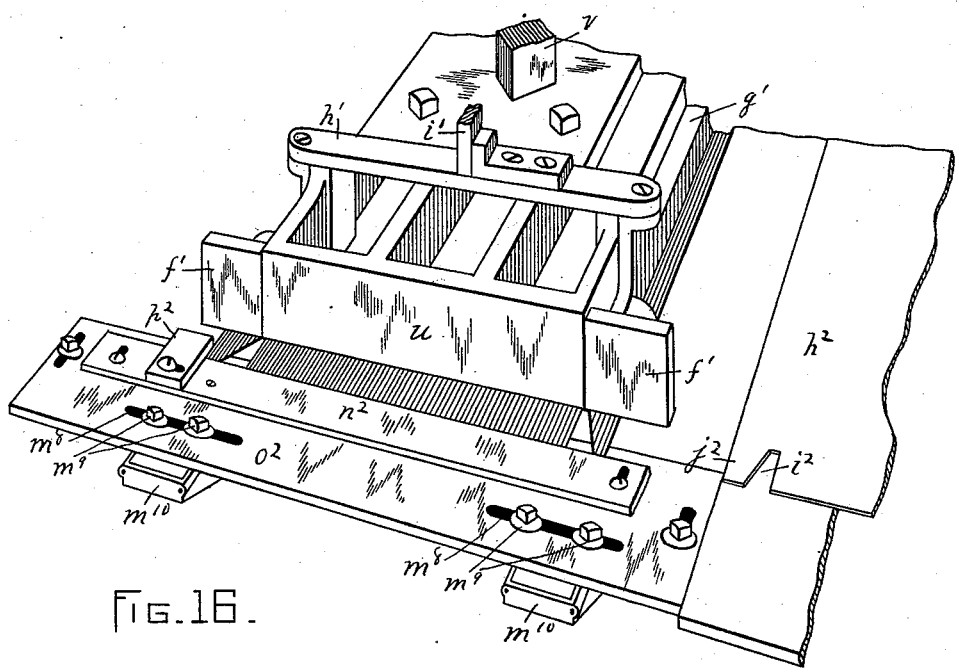
Figure 16:
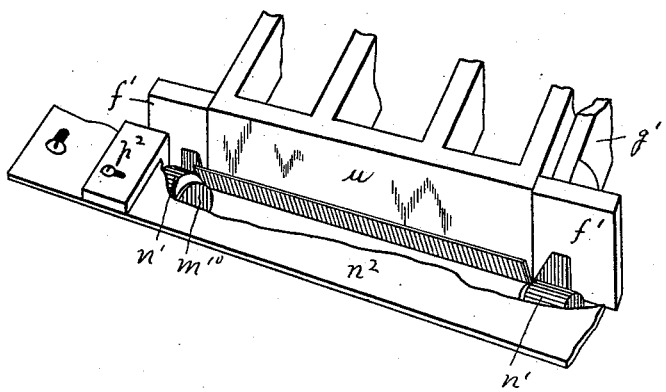
Figure 17:
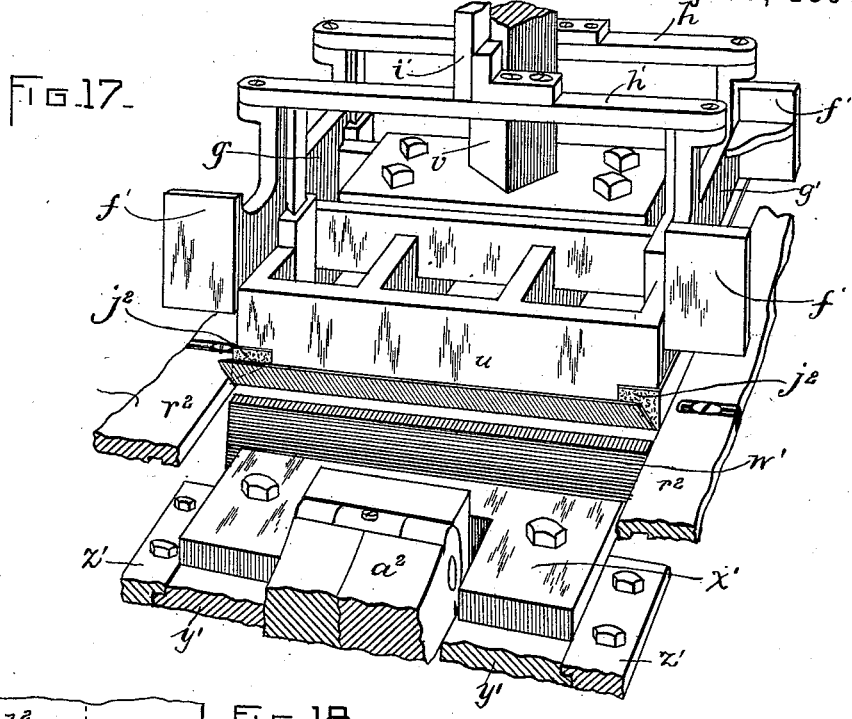

In the said drawings Figure 1— is a front view of our improved paper box making machine complete. Fig. 2— is an end view thereof. Fig. 3— is a top plan view, omitting the forward abutting plate. Fig. 3ª— is a section on line 3ª—3ª of Fig. 3. Fig. 4— is an enlarged central sectional view taken on the line 4—4 of Fig. 1. Fig. 5— is a longitudinal sectional view, on line 5—5 of Fig. 4. Fig. 6— is an end view of the plunger and wings in the position they will occupy when the plunger and wings are at rest, or when they are making their initial movement to secure the application of paste to the tab ends of the sides of the box. Fig. 7— is a top plan view of the same. Fig. 8— is a side view of the same. Fig. 9— is a side elevation of the paste box and its equipments, a portion of the frame being represented as broken out. Fig. 10— is a top plan view of the same. Fig. 11— is a top plan view of the bed, showing on an enlarged scale the means directly concerned in applying the paste and turning up and forming the sides of the box hereinafter more particularly described. Fig. 12— is a top plan view of the platen presser and means for operating, guiding and supporting the same. Fig. 13— is a longitudinal central sectional view of Fig. 12. Fig. 14— is a section on line 14—14 of Fig. 12, looking toward the left of the latter figure. Fig. 15— is a perspective view showing the relationship of the parts immediately concerned in forming the pasteboard into a box or box-lid, immediately after the blank has been moved into position under the plunger and wings, the gage plates being omitted at the farther end of the plunger. Fig. 16— is a detail view showing the initial movement of the parts in which paste is applied to the tab ends of the sides of a box or box-lid. Fig. 17— is a detail view showing the position of the parts after the tab ends of the sides have been pasted and bent and the sides themselves folded into position just previous to folding the ends upon the pasted tab ends of the sides and securing them thereto. Figs. 18, 19, 20 and 21— are diagrams illustrating the successive steps performed upon the blank of material in the course of transforming the same into a box or box-lid.

In the drawings, $a$ designates the frame of the machine which may be composed of any material and be of any form and strength suiting it to support the various parts of the machine.

$b$ is the driving shaft upon which is a clutch pulley $c$ controlled by a shipper lever $d$, whereby the machine may be started and stopped by the operator. On the shaft $b$ is a pinion $e$ (Fig. 3) which engages a gear wheel $f$ on the cam shaft $g$ and operates the latter.

$h$ is the feed table connected with the frame $a$ by means of bolts $h^5$ which pass through feet $h^6$ on the feed table and through the frame $a$, and said feed table is stayed by the braces $i$. The said feed table is provided with the guards or standards $j$ for the ends, and the abutting plate $k$ for the forward edges of the stock to be operated upon, a pile or stack of material being shown in position in Fig. 2. The guards or standards $j$ are made adjustable horizontally, by means of slots and attaching bolts in their bases, as will be understood by an inspection of Fig. 3, so as to adapt them to sheets of varying lengths, and the abutting plate $k$ is adjustable vertically (see Fig. 2) in order to suit the machine to operate upon sheets of stock of varying thicknesses. This abutting plate $k$ is fitted to suitable vertical guideways in the upright plate $k^3$ mounted on the table $h$, see Fig. 2. The upper end of the plate $k^3$ is bent horizontally and supports screws $k^4$ the lower ends of which are tapped into suitably threaded holes in the upper end of the plate $k$. By such means the plate $k$ is adjustable vertically as described.

$l$ is a sliding carriage or feeder adapted to be reciprocated in slotted guideways $m$ formed through the table $h$. This sliding carriage consists of two strips fitting the guideways $m$ as shown in Fig. 3, said strips being connected together underneath the table $h$ by a bar $l^3$ (see Fig. 2). At the forward ends of the narrow strips of the carriage are formed plates or lugs $k^2$ which project above the surface of the table $h$ for the purpose hereinafter described.

On the upper surface of the table $h$ are secured two blocks $k^5$ to form stops to prevent backward movement of the lowermost blank when the carriage and the plates $k^2$ retreat after having pushed forward one blank. To the rod $l^3$ is also connected a block $l^4$ which slides in a central guideway in the table $h$ and to which block $l^4$ is secured the spring $s^2$ hereinafter referred to.

$n$ is a cam on the shaft $g$ which is adapted to operate on the end of one arm of an angular lever $o$ fulcrumed at $p$ on a bracket secured to the frame, the other end of the said angular lever being pivoted to one end of a pitman $q$, the opposite end of which is pivotally connected with a lever $r$ pivoted at its lower end on a bracket $s$ and connected at its upper end, by means of the link $t$, with the bar $l^3$ of the sliding carriage $l$, so that as the shaft $g$ and cam $n$ are rotated the feeding carriage $l$ will be reciprocated.

$u$ is a plunger, the exterior of its sides and ends conforming to the size and form of the interior of the box or box-lid to be constructed. The said plunger is arranged centrally of the machine, and is supported by a vertically movable rod $v$ arranged in suitable bearings in a strong bracket $w$ connected with the frame $a$ and when in raised position stands above the bed of the machine.

$y$ is a lever fulcrumed at $z$ on the bracket $w$ and having a loose pivotal connection at its inner end with the rod $v$, (see Fig. 4.) At its outer end the lever $y$ is pivotally connected with the upper end of a rod $a'$ which is provided with a weight $b'$ to counterbalance the plunger $u$. The rod $a'$ is pivotally connected at its lower end with a lever $c'$ fulcrumed at $d'$ on a bracket attached to the frame, and adapted at its inner end to be acted upon and controlled by a cam $e'$ on the cam shaft $g$, the operation of the said cam $e'$ being, through the medium of levers $c'$ and $y$ and rods $a'$ and $v$, to raise and lower the plunger $u$, in time and manner as hereinafter explained.

$f'$ $f'$ $f'$ $f'$ are wings which are arranged to form practically extensions of the ends of the plunger $u$. The said wings are constructed and arranged to have a vertical movement independent of the plunger so that they may be either moved in unison with the latter or out of time therewith. The two wings at opposite ends on the same sides of the plunger are integrally connected by the bar $g'$ (Figs. 6, 7 and 8), and the two bars $g'$ are tied or connected by the bars $h'$ which extend over the plunger $u$. Rods $i'$ extend up from the bars $h'$ and are supported in suitable bearings connected with the bracket $w$ so as to be moved vertically therein in order to raise and lower the wings. The wings being connected by bars $g'$, and the two bars $g'$ being connected by the bars $h'$ which latter have rods $i'$ extending through bearings in the bracket $w$, it is obvious that said bars form bearings for the rods $i'$, and through the connections described, for the wings $f'$.

$j'$ is a lever fulcrumed on the bracket $w$ and pivotally connected at its inner end to the rod or rods $i'$, by means of a pin projecting from the rod $i'$ through a slot in the lever $j'$ as shown in Fig. 2. At its outer end, the lever $j'$ is pivotally connected with the upper end of a rod $k'$, the lower end of which is pivoted to a lever $l'$ fulcrumed on a bracket of the frame and engaged and controlled at its inner end by a cam $m'$ on the cam shaft $g$, the said cam $m'$ operating, through its connections with the wings $f'$, to raise and lower the same in the same manner, though not always in the same time, as the plunger $u$ is actuated by its cam $e'$. The said cam $m'$ may be of any suitable construction to operate the wings by means of lever $l'$ and the other connections described, in the manner above set forth.

The relationship of the wings and their attached parts to the plunger is clearly illustrated in Figs. 6, 7, 8 and 15.

$m^{10}$, $m^{10}$, $m^{10}$, $m^{10}$ designate paste boxes supported below the gage or forming plates $o^2$, as shown in Figs. 5 and 15, by means of bolts $m^9$ extending through slots $m^8$ in said plate into the sides of the boxes $m^{10}$. By this means the said paste boxes are adjustable on and with the said gage plates, one such paste box being arranged opposite each wing, $f'$. Journaled in the upper forward end of each pastebox, is a paste roll $n'$ upon which paste is distributed by a roll $o'$ located in the rear thereof, paste being supplied to the latter roll by a supply roll $p'$ in the bottom of the box, which latter roll is secured to shaft $q'$ supported in suitable bearings in the frame and extending across the same from front to rear (see Figs. 9 and 10). The distributing roll $o'$ has its bearings formed in sliding boxes $m^7$ from each of which a rod $m^6$ extends through a casing $m^5$ formed on the side of the box, and a spring $m^4$ (indicated by dotted lines in Fig.

9) is interposed between the end of the rod $m^6$ and a screw $m^3$. By this construction the distributing roll $o'$ is yieldingly pressed against the paste roll $n'$.

$r'$ (Fig. 11) designates a shaft supported in bearings connected with the frame and extending lengthwise of the same at the rear thereof, the said shaft being provided with bevel gears $s'$ which engage like gears on the shaft $q'$, not all of which gears are shown in the drawings, but the construction and operation of which will be understood without further illustration or description.

On one end of the shaft $r'$ is a pulley $t'$ and a similar pulley $v'$ is connected with the shaft $b$ (see Fig. 11). A belt $u'$ passing over the said pulleys operates to rotate the shafts $r'$ $q'$ and the paste rolls $n'$ are rotated from the shafts $r'$ through the medium of the gears connected with the several rolls in each paste box, as will be readily understood by an inspection of Figs. 9 and 10.

$w'$ $w'$ designates press platens, the lower face of the body $x'$ of each being tongued and grooved, to adapt it to rest and to be adjusted upon a base $y'$, the upper face of which is tongued and grooved correspondingly to the body $x'$. The base $y'$ is adapted to be reciprocated on the bed $x$ in ways $z'$ formed on the bed.

$a^2$ designate toggle levers the inner ends of which are pivoted upon the upper end of a lever or arm $b^2$. The outer end of one of the toggle levers is pivoted or fulcrumed on a lug projecting upward from the reciprocating base $y'$, and the like end of the opposite lever is fulcrumed upon a stationary part of the machine.

$c^2$ $c^2$ are cams on the cam shaft $g$ which act upon the arms $b^2$, to raise and lower the same, so as to effect, through the toggle levers $a^2$, the reciprocation of the presser platens $w'$ and their bases $y'$ in the guideways $z'$.

The arms $b^2$, the upper ends of which are connected with the center of the toggle levers, are each connected with a slide $b^4$ fitted to move vertically in ways $b^5$ formed on a web of the frame, the slide having a roll $b^3$ acted upon by the cam $c^2$. The slide has a rectangular opening $b^6$ to permit the passage of the box delivering belt $d^2$.

$d^2$ is an endless apron arranged in the lower part of the frame, so as to travel around rollers $e^2$ $f^2$ (see Fig. 5). A belt $g^2$ arranged about a pulley on the driving shaft $b$ and another on the shaft of roller $f^2$, serves to rotate the latter roller and move the apron in the direction indicated by the arrows marked in juxtaposition thereto.

Figure 18:
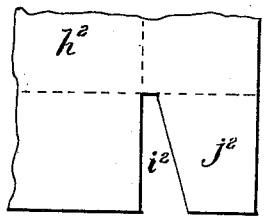
Figure 19:
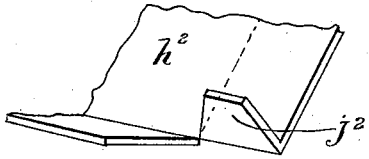
Figure 20:
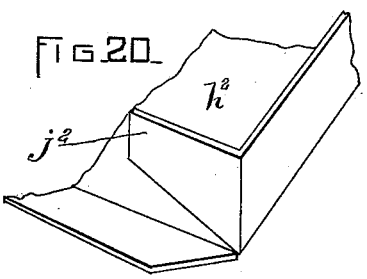
Figure 21:
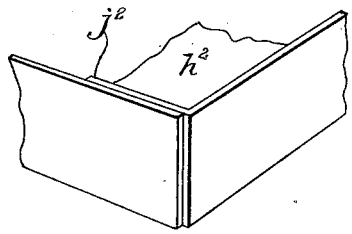

In the use of our invention, the stack of blanks $h^2$ scored at the corners as at $i^2$, so as to form tab ends $j^2$ on the ends of the side portions (see particularly Fig. 18), is placed in position on the table $h$ with the forward or inner edges of the blanks above the lowermost one resting against the abutting plate $k$ and their ends against the standards $j$. The lower blank will be opposite the space $l^2$ below the plate $k$. As, now, the machine is set in motion and the feeding carriage is moved inward, the forward edges of the plates $k^2$ thereon, will engage the outer edge of the lower blank of the stack and feed the said blank forward or inward through the space $l^2$ carrying it under the plunger and wings $f'$ to the position in which it is represented in Fig. 15. In the operation of feeding the blank forward or inward, it may be guided at its ends in ways formed by the plates $n^2$ (one at each end of the plunger opening) adjustable on the plates $o^2$ and be stopped by the adjustable blocks $p^2$ on the plate $n^2$. These forming or gage plates $o^2$ are supported by and adjustable toward and from each other on portions of the frame $a$ of the machine, as indicated in Figs. 3, 4 and 5. The plates $n^2$ are omitted from Fig. 16 in order to show the forming operation more clearly. It is to be understood that when the blank is fed under the plunger it is supported at first by the edges of the blank resting on the plates $o^2$ until it is pressed down between the said plates by said plunger. The plunger and wings will now descend together, the latter pressing the lower or outer surface of the tabs $j^2$ against the paste rolls $n'$, and securing the application of paste thereon, all as is clearly represented in Fig. 16. In this operation, the tabs $j^2$ in addition to receiving paste will be bent up substantially at a right angle to the portion designed to form the side of the box, while the part designed to form the end, will be bent at a slight angle to the top or bottom portion (as the case may be) by coming into contact with plate $o^2$. The blank will now have been transformed from its normal shape as represented in Figs. 15 and 18, to that portrayed in Figs. 16 and 19, and the plunger $u$ will, for a moment come to a stop in its downward movement, while the wings $f'$ will retreat or be raised, as shown in Fig. 17, when the descent of the plunger will be resumed with the effect of bringing the side portions of the box into contact with the folding plates $r^2$ which will effect the folding of the sides at a right angle to the top or body $h^2$, as shown in Figs. 17 and 20. Upon the further descent of the plunger, the ends will be folded up against the pasted surface of the tabs $j^2$ and the ends of the plunger, and the presser platens $w'$ operated by the toggle levers $a^2$ will press the ends against the pasted tabs $j^2$ and the ends of the plunger, giving final shape to the box or box-cover as the case may be. The plunger will now rise, leaving the box part in place between the plates $r^2$, allowing the paste to "set" until the next blank is formed into a box part, which operation will result in pushing down the previously formed box part so that it will drop upon the endless apron $d^2$ by which it will be carried out and delivered from the machine.

To guide the formed box in its descent on to the apron, a vertical plate $d^3$ is secured by means of a bracket $d^4$ (see Fig. 4) to the under edge of plate $r^2$, each side of the opening for the box.

A spring $s^2$ under the sliding carriage $l$ serves to support the blank when carried inward under the plunger, so that it will not sag and be, by its gravity, carried out of its guideways or be otherwise displaced. This spring $s^2$ is attached at its outer end to the under side of the sliding carriage $l$ and projects beyond the lugs $k^2$ so as to support a blank when it is pushed forward under the plunger. On the retreat of the carriage, the spring also moves back out of the path of movement of the plunger.

It is to be noted that the plates $o^2$, the platen pressers $w'$ and other parts of the machine are made adjustable so as to adapt the machine for use in making boxes of various sizes and the abutting plate $k$ is made adjustable vertically so as to vary the space left thereunder in order to permit the feed of stock varying in thickness.

Having thus described the nature of our invention and explained a way of constructing and using the same, though without attempting to set forth all of the forms in which it may be made or all of the modes of its employment, we declare that what we claim is:—

1. A paper box making machine comprising in its construction folding plates for the ends and sides of the box, located in different horizontal planes, a movable plunger, movable wings fitted to slide against the sides of the plunger and extending laterally and in the vertical plane of the ends thereof, and means for moving said plunger and wings together or independently, for the purpose set forth.

2. A paper box making machine comprising in its construction the paste-box provided with paste-supplying rolls, and a movable plunger having independently movable wings extending laterally from its ends to carry the tabs of scored stock into contact with the paste rolls and bend the said tabs at right angles to the sides, substantially as described.

3. A paper box making machine, comprising in its construction a single vertically movable plunger and folding plates to co-operate therewith located in different horizontal planes, platen presses movable toward and from each other in a plane opposite the lowermost position of the plunger and below the lower folding plates, the said platen presses having cross ribs on their under surfaces, reciprocating beds having cross ribs on their upper surfaces, and means for clamping said beds and presses together with their cross ribs intermeshing, substantially as described.

4. A paper box making machine comprising in its construction folding plates for the ends and sides of the box, located in different horizontal planes, a movable plunger, movable wings fitted to slide against the sides of the plunger and extending laterally and in the vertical plane of the ends thereof, means for moving said plunger and wings together or independently, and platen presses movable toward and from each other in a plane opposite the lowermost position of the plunger, substantially as described.

In testimony whereof we have signed our names to this specification, in the presence of two subscribing witnesses, this 4th day of March, A. D. 1892.

HENRIE D. STONE.
CHARLES THIBODEAU.

Witnesses:
ARTHUR W. CROSSLEY,
J. MARTIN CILLEY.